April 12, 1966      C. D. MILLER      3,245,750

OPTICAL APPARATUS FOR USE IN PHOTOGRAPHY

Filed Dec. 30, 1960      7 Sheets-Sheet 1

INVENTOR.
CARL DAVID MILLER

BY *Jerome R. Cox*

ATTORNEY

April 12, 1966  C. D. MILLER  3,245,750
OPTICAL APPARATUS FOR USE IN PHOTOGRAPHY
Filed Dec. 30, 1960  7 Sheets-Sheet 2

INVENTOR.
CARL DAVID MILLER
BY Jerome R. Cox
ATTORNEY

Fig. 7

April 12, 1966      C. D. MILLER      3,245,750

OPTICAL APPARATUS FOR USE IN PHOTOGRAPHY

Filed Dec. 30, 1960      7 Sheets-Sheet 4

*INVENTOR.*
CARL DAVID MILLER

BY *Jerome R. Cox*

ATTORNEY

April 12, 1966  C. D. MILLER  3,245,750
OPTICAL APPARATUS FOR USE IN PHOTOGRAPHY
Filed Dec. 30, 1960  7 Sheets-Sheet 5

INVENTOR.
CARL DAVID MILLER
BY
Jerome R. Cox
ATTORNEY

April 12, 1966     C. D. MILLER     3,245,750
OPTICAL APPARATUS FOR USE IN PHOTOGRAPHY
Filed Dec. 30, 1960     7 Sheets-Sheet 6

FIG 13

INVENTOR.
CARL DAVID MILLER
BY
*Jerome R. Cox*
ATTORNEY

April 12, 1966     C. D. MILLER     3,245,750
OPTICAL APPARATUS FOR USE IN PHOTOGRAPHY
Filed Dec. 30, 1960     7 Sheets-Sheet 7

INVENTOR.
CARL DAVID MILLER
BY
Jerome R. Cox
ATTORNEY

United States Patent Office 3,245,750
Patented Apr. 12, 1966

3,245,750
OPTICAL APPARATUS FOR USE IN
PHOTOGRAPHY
Carl David Miller, Columbus, Ohio
(32871 Electric Blvd., Avon Lake, Ohio)
Filed Dec. 30, 1960, Ser. No. 79,777
24 Claims. (Cl. 352—113)

The invention disclosed herein and illustrated in the drawings appended hereto relates generally to optical apparatus for photographic cameras and to machines and processes relating thereto, and more particularly to that class of cameras wherein a fixed image is photographically exposed upon a constantly moving photosensitive film, and to machines and processes for forming a film for use in such a camera. This application is in part a continuation of my application Serial No. 696,173 filed November 13, 1957 now abandoned.

There are many types of cameras, known collectively in the art as optical compensators, which operate to move an image at a rate which is synchronized with the rate of motion of a photographic film in constant motion. One such camera is the well known rotating prism type of camera wherein a photosensitive film is moved at a constant rate across an optical axis of the camera and rays of light entering the camera and focused to form an image adjacent said film are intercepted by a rotating prismatic body which functions to refract the rays and to impart motion to the image thus rendering the image stationary with respect to the moving film.

A primary limitation of the rotating prism camera lies in the fact that it is difficult to insure that each successive frame of the sensitized film will be advanced to the exact relative position, with respect to the plane of the image to be exposed on the film which corresponds to the position of exposure of the last frame of film previously exposed.

Precise registration of the photographic images on successive frames of exposed film is essential to satisfactory receiving of the resulting photographs in rapid sequential succession such as, for example, viewing of the photographs as projected motion pictures. Failure to maintain successive frames of film in accurate registration with the photographic image is a characteristic common to all types of high speed cameras which are presently known. Such failure results in a jumpy projected image when the photographs are projected sequentially as motion pictures upon a motion picture screen. The jumpy image is distracting to a viewer and tends to make the projected motion picture appear blurred and lacking in sharp detail.

A further disadvantage of rotating prism devices lies in the comparatively long exposure time, relative to the reciprocal of the repetition (or framing) rate. This comparatively long exposure time characteristic is undesirable in any camera use where the resulting photographs are to be used for accurate measurement of the displacement of objects from individual film frames. Generally, such uses of high speed cameras far outnumber other applications wherein the primary object is to provide an illusion of motion when a photographic series is projected as a motion picture. In the latter cases a relatively long exposure time for each individual frame of film is often desirable.

A still further limitation of rotating prism cameras lies in the fact that a separate mechanism is required for synchronizing the rate of movement of the prism with that of the moving film.

Objects

One object of my invention is to provide a high speed camera capable of accurately locating an image on adjacent frames of film with respect to film perforations and thereby providing a steadiness of the resulting projected motion picture which is fully equal to that of the best of relatively low speed intermittent camera devices.

A further object of my invention is to provide a camera capable of affording a short exposure time relative to the reciprocal of the framing rate (time between two frames).

A further object of my invention is to provide means for creating an intermediate condition of distortion and means for subsequently correcting said distortion whereby the foregoing objects are accomplished.

A further object of my invention is to provide a photographic film of unitary structure having means for exposing said film and means for optically compensating rays of light formed integrally with the film.

A further object of my invention is to provide a focal plane shutter having optical compensating means comprising a lens disposed transversely of a light transmitting portion of said shutter and movable therewith.

A further feature of my invention is to provide a photographic film having alternate opaque portions and transparent portions transversely disposed along the length of said film.

A further feature of my invention is to provide a photographic film having alternately photosensitive portions and optical compensating portions.

A further object of my invention is to provide a camera having a pair of films driven at identical speeds, one such film having light sensitive frames upon which the image is reproduced and the other having alternate opaque and transparent portions serving as a shutter, and also having lenses serving as optical compensators.

A further object of my invention is the provision of processes for forming film having lenses formed therein for use in the cameras disclosed whereby the film serves as an optical compensator, and for forming film having alternate opaque and transparent portions whereby the film serves as a shutter.

A further object of my invention is the provision of machines for forming film having lenses and/or alternate opaque and transparent portions for the purposes set out in the last paragraph.

A further object of my invention is the provision of a film having lenses formed therein.

A further object of my invention is the provision of a film having alternate opaque and transparent portions.

Further objects and features of the invention will be apparent from the subjoined specification and claims when considered in connection with the attached drawings.

In some respects the objects of this invention are similar to the objects of the invention disclosed in my prior Patent No. 2,400,885 granted to me on May 28, 1946 for a high speed camera.

Drawings

In the drawings which disclose several embodiments of my invention.

Detailed Description

Figure 1:
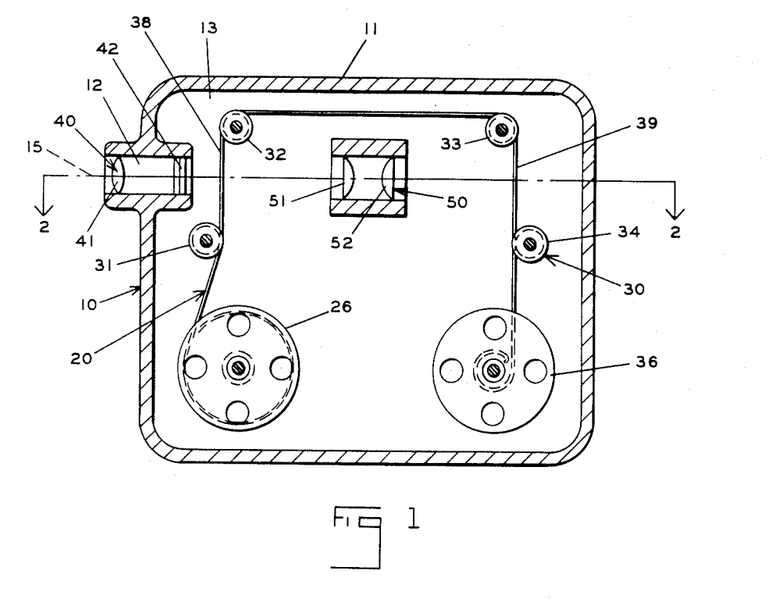
FIG. 1 is a side view in section showing a camera incorporating an optical apparatus of my invention.

Referring now to the drawings for a detailed description of the first shown embodiment of my invention, it may be seen in FIG. 1 that I have shown a photographic camera 10 comprising a light tight container 11 having an opening 12 through which light enters central enclosure 13 along optical axis 15.

Movable filmstrip 20 is shown within the container 11. The filmstrip is shown in detail in FIGS. 3 and 4 and comprises a plurality of frame portions 21 intermediate a plurality of lens portions 22. Each frame portion 21 may be provided adjacent its outer edges with suitable perforations 23 for cooperating with the film feed sprocket of a motion picture projector if it is desired to project the photographic image from the negative film by such means after development. Each frame portion 21 is further provided on one of its oppositely disposed plane surfaces with a coating 24 of photosensitive material, and on the other plane surface with a coating 25 of opaque material.

Filmstrip 20 is wound in the conventional manner on supply spool 26 with opaque surfaces 25 disposed outwardly (i.e., to the left). The outer end of strip 20 is secured in the usual manner to take-up spool 36. That portion of strip 20 which is intermediate spools 26 and 36 is maintained taut by known means and in frictional engagement with a film guide 30 which comprises individual guide rollers 31, 32, 33 and 34, each of which is pivotally secured to container 11. Film guide rollers 31, 32, 33 and 34 are of conventional form and are disposed within enclosure 13 with rollers 31 and 32 in relative positions suitable for guiding that portion 38 of strip 20 intermediate said rollers 31 and 32 transversely of axis 15 and within a plane perpendicular to said axis. Rollers 33 and 34 are similarly disposed within enclosure 13 for guiding that portion 39 of strip 20 intermediate said rollers 33 and 34 transversely of axis 15 and within a second plane perpendicular to said axis and appropriately spaced along axis 15 from the first mentioned plane. Rollers 32 and 33 are spaced apart within enclosure 13 an appropriate distance for insuring that the central point of one of lens portions 22 and the central point of one of frame portions 21 will at times be in simultaneous register with axis 15. Thus it may be seen that when filmstrip 20 is moved from spool 26 to spool 36, the filmstrip is so guided by means 30 that it intersects optical axis 15 twice, and so that each time a transparent portion 22 (FIG. 4) of strip 20 is in register with said optical axis at the one of such points of intersection which is nearest the objective lens of the camera (i.e., to the left), and the photosensitized surface 24 of a frame portion 21 of strip 20 is in registration with axis 15 at the other of said points of intersection.

Rays of light generated by or reflected from an object outside camera 10 enter camera 10 through opening 12 and pass into enclosure 13 along axis 15. Said rays of light are refracted by objective lens 40, movable lens 22 and condenser lens 50, each of which is described hereafter in detail.

Figure 2:
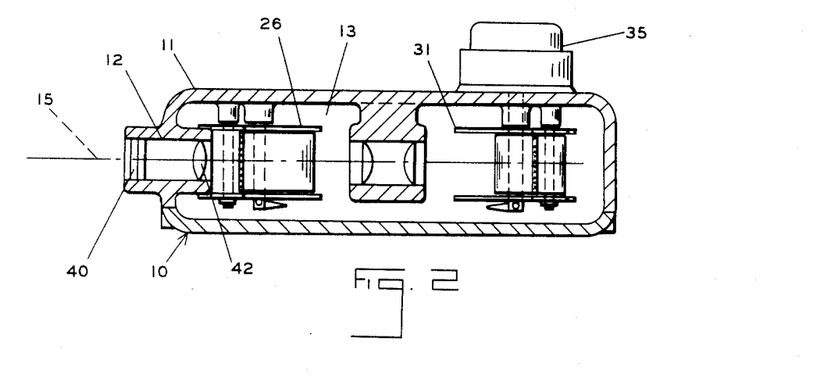
FIG. 2 is a view in section taken along the line 2—2 of FIG. 1.

Objective lens 40 (FIG. 1) comprises means for forming a primary optical image and includes cylindrical lens element 41 having surfaces which are curved only as seen in the vertical section of FIG. 1; and a cylindrical lens element 42 having surfaces which are curved only as seen in the horizontal section of FIG. 2. Elements 41 and 42 cooperate according to well known optical principles to form a primary image adjacent to strip portion 38 within a plane which is substantially perpendicular to axis 15. Elements 41 and 42 are formed with suitable refracting powers for forming a primary image which is distorted to any desired degree in a manner described hereafter. The primary image so formed is distorted relative to the object in the respect that a different ratio exists between the horizontal dimensions of the primary image and the corresponding dimensions of the object, from that which exists between the vertical dimensions of the image and the vertical dimensions of the object. This type of distortion is hereinafter and in the claims hereof sometimes called foreshortening.

It is well known to those schooled in the art that such foreshortening may be obtained by employing combinations of elements other than the combination of two mutually perpendicular cylindrical elements such as I have shown and described. For example, a suitable compound lens may include in combination a plurality of the following elements: (1) purely cylindrical elements; (2) purely spherical elements; and/or (3) astigmatic elements of any kind or description.

Elements 41 and 42 are secured by suitable means against rotation about axis 15 and are further retained within opening 12 by appropriate adjusting means, well known in the art, for controllably repositioning them longitudinally along axis 15 and thereby affording fine adjustment of the focus of the primary image.

In one embodiment of my device the movement of the portion 39 of film 20 corrects the foreshortening of the primary image.

If the foreshortening is not fully corrected by movement of the portion 39 of film 20, the condenser lens 50 (FIG. 1) comprises means for correcting said foreshortening of the primary image to any desired extent, and for forming a secondary image and is disposed along axis 15 on the side of strip portion 38 opposite from objective lens means 40 and intermediate the separate points of intersection of strip 20 and axis 15. Condenser lens 50 comprises lens elements 51 and 52 which are preferably ordinary photographic objectives mounted front-to-front along axis 15. Lens elements 51 and 52 of means 50 are of such focal lengths that conjugate foci are oppositely disposed along axis 15 at the position of the previously described primary image plane adjacent strip portion 38, and at a secondary image plane located perpendicular to axis 15 and adjacent filmstrip portion 39. If it is desired that the ratio between the longitudinal and transverse dimensions of the secondary image be other than the ratio of the corresponding dimensions of the primary image, then that ratio in the secondary image may be changed by introducing at least one cylindrical component into lens element 51 and/or lens element 52 in condenser lens 50.

*Operation*

In the operation of my device, light entering opening 12 (FIG. 1) travels along axis 15 and is optically refracted by objective lens 40 to form an image having appropriate longitudinal and transverse dimensions in a primary image plane perpendicular to and centered upon axis 15 adjacent film portion 38. Spool 36 is rotated in a clockwise direction by suitable motor means 35 well known in the art and filmstrip 20 is unwound from spool 26, moves through the path shown in FIG. 1 in frictional engagement with successive guide rollers 31, 32, 33 and 34 of film guide means 30, and is rewound upon take-up spool 36. As strip 20 moves from roller 31 to roller 32, the opaque surface 25 (FIG. 4) of frame portions 21 is disposed toward objective means 40 and serves as a shutter for preventing the passage of light along axis 15 beyond the opaque surface 25 of strip portion 38.

Strip 20 carries with it integral lens portions 22 disposed transversely of strip 20. When the leading edge of one of lens portions 22 is moved into scanning registration with the primary image adjacent strip 20, lens 22 serves both to transmit and to refract the light passing through said primary image. Further movement of lens 22 across said primary image serves to rotate each ray of light, passing through said primary image, substantially about a stationary point adjacent to lens 22. Such stationary point will not in general be the same for various light rays. The light passing through any horizontal line within the primary image, upon passing through lens 22 and upon being transmitted through condenser lens 50, is then projected by lens 50 in the form of a substantially flat beam of light which is rotated substantially about a point adjacent film portion 39, said point being the conjugate focus of lens 50 relative to one of said centers of rotation adjacent lens 22. Lens 22 moves with strip 20 across the primary image. The beam of light projected by condenser lens 50 is focused in the secondary image plane and is moved vertically across said image plane for progressively exposing continuously successive transverse portions of sensitized surface 24 of strip 20. Lenses 40 and 50 and lens 22 are so formed, so arranged and so adjusted that the longitudinal motion of film portion 39 with respect to the rotating beam projected by condenser lens 50 will automatically correct for the distorted relation of the longitudinal and transverse dimensions of the primary optical image, which are introduced by objective lens 40, and an undistorted photographic image will be exposed on each successive frame 21 of film 20.

In this disclosure lens element 41 is treated as having no substantial effect in bending rays of light in the transverse direction, but as focusing light rays only in the longitudinal direction of strip 20. Lens 42 on the other hand, produces an effect analogous to that of lens 41 except that the focusing is done in the direction perpendicular to the direction of focus of lens 41.

Lens elements 41 and 42 may be of the same or different focal lengths and situated at different distances from the image plane in such manner that the ratio of image dimensions to corresponding object dimensions may have different values in the longitudinal and transverse directions.

All of the above material applies equally to lens elements 51 and 52.

Lens 40 is situated in such manner as to form a primary image near to, but not necessarily exactly upon, filmstrip 20. Either before or after passing through the plane of that image, the light will pass through the transparent portion 22 of strip 20 and will be refocused by lens 50 to form an image on the photosensitive surface 24 of portion 39 of filmstrip 20. This image on surface 24 is referred to as the secondary image.

The cylindrical lens 22 when located near the position of the primary image performs two functions. The first is that of a focal-plane shutter. This function would be performed just as well if lens portions 22 were not actually lenses at all but simply transparent bands across the filmstrip 20. The second function is one of optical compensation, that is, an action of imparting an apparent motion to the primary image as viewed by an eye placed in the position of lens 50. This apparent motion in the primary image becomes a real motion in the secondary image, and must at that point be matched with the actual velocity of the film.

The focal-plane shutter action allows various transverse bands in the primary image to be illuminated successively in the secondary image. If the lens sections in the film were simply transparent bands without lens action, photographs would still be exposed on the film. They would, however, be blurred in the longitudinal direction because the secondary image, like the primary image, would always be stationary, while the film would always be moving.

In order to secure a perfect exposure, the secondary image exposed on the film cannot have the same longitudinal dimension as the primary image, because of the fact that the film moves during the successive exposure of the various transverse bands in the image. The primary aim is that the longitudinal dimension of the photographic image which actually appears on the developed film shall equal the longitudinal distance between the nearer edges of two adjacent transparent sections in the film. For purposes of this disclosure, that distance will be referred to hereafter as "$y$".

Let it be assumed momentarily that the filmstrip 20 is removed from the camera. Then assign to the longitudinal dimension of the secondary image the value "$x$," and assign to the longitudinal dimension of the primary image the value "$z$."

Now let strip 20 be reinserted in the camera and let it be moved a sufficient distance to traverse the entire longitudinal dimension $z$ of the primary image. Obviously, during the traverse of the primary image, the film will move a total distance $z$, both at the position of the primary image and at the position of the secondary image. The illuminated portion of the secondary image, however, will move a distance $x$ which is equal to the total longitudinal dimension of the secondary image.

Two cases will be considered in which images having the correct longitudinal dimension can be exposed on the film:

*Case 1.*—Where the focal-plane shutter action, as seen in the secondary image, moves in the same direction as the film but faster than the film, the following relation must hold in order that the longitudinal dimension of the image as exposed on the film shall be equal to $y$:

$$x-z=y$$

Hence, the ratio of longitudinal dimension of a secondary image to longitudinal dimension of the primary image must be $$r=\frac{x}{z}=\frac{x}{x-y}$$

or $$r=\frac{y+z}{z}$$

By examination of these equations, it will be seen that $r$ becomes greater and greater as either $x$ or $y$ is decreased. When $x$ becomes as small as $y$, $r$ becomes infinite; and when it becomes smaller than $y$, $r$ becomes negative. Hence, Case 2 involves only values of $x$ greater than $y$. If $z$ is made equal to $2y$, then $x$ is equal to $3y$, and $r$ is equal to 3/2. This is a practical value for $r$, but a value of z as great as 2y is undesirably high. For values of z less than 2y (values of x less than 3y), the value of r becomes undesirably high. For these reasons, Case 1 is not desirable.

*Case 2.*—The focal-plane shutter action, as seen in the secondary image, moves in the opposite direction to the film. The most convenient way to produce this effect is to loop the film around in such a manner, in its passage from primary to secondary image, that it will move in the same direction at both places. The focal-plane shutter action, as seen in the secondary image, will move in the direction opposite to its motion in the primary image, unless costly undesirable provisions are made to make it move in the same direction.

In this case, in order that the motion of the focal-plane shutter as seen in the secondary image shall amount to the value y relative to the motion of the film itself, the following relations must hold between x, y and z, all actual movements being considered as positive:

$$x+z=y$$

Hence, the ratio of longitudinal dimension of secondary image to longitudinal dimension of primary image must be:

$$r=\frac{x}{z}=\frac{x}{y-x}$$

or $$r=\frac{y-z}{z}$$

From these equations it is seen that when x is increased upward until it becomes equal to y, r becomes infinite, just as when x was decreased downward to y in Case 1. If x is increased until it becomes greater than y, r becomes negative. Hence Case 2 involves only values of x smaller than y.

As x is reduced downward from the value equal to y, the value of r becomes continuously smaller until it is equal to unity at a value of x equal to ½y. Here the value of z is also equal to ½y. For still smaller values of x, the value of r becomes fractional, which is generally impractical. The value of x and z equal to ½y therefore appears to be the optimum, hence Case 2 should be regarded as the preferred arrangement, with values of x and z approximately ½y.

From the foregoing, it is now clear how an image of the correct longitudinal dimension can be exposed on the film, though except for my improvements as described immediately below, it would be blurred because of the stationary condition of the image elements during their exposure on the moving film.

The purpose of the lens action in the cylindrical lens sections of the film is to impart motion to the secondary image which is equal in velocity to the motion of the film at the secondary image, at the same time that it is being exposed by the focal-plane shutter. Hence, again, two cases must be considered.

*Case 1.*—The focal-plane shutter action of strip 20 as seen in the secondary image moves in the same direction as the film, but faster. It is necessary for the cylindrical lens element in the film to produce a motion of each element of the secondary image while that element is being exposed. This motion of each element of the secondary image must be in the same direction as the movement of the film at the position of the secondary image. An apparent movement of an element of the primary image in the same direction as the film movement at the position of the primary image will appear as a movement of the element in the secondary image in the same direction as the movement of the film at the secondary image.

Hence, in Case 1, if one looked toward the primary image with his eye in the position of lens 50, he should see each element of the primary image in movement in the same direction as the film. The action of the negative cylindrical lens sections in the film would cause his line of sight, as it extended through and beyond the lens sections, to rotate in the counter-clockwise direction as seen in FIG. 1. When the extended line of sight is rotated in the counterclockwise direction, anything seen to the left of the film, and which is actually stationary, appears to be moving in the same direction as the film. The farther beyond the film this stationary object is located, the faster it appears to move. Hence, if the primary image is focused at the proper distance to the left of the film, the image as seen by lens 50 can have any desired apparent speed of motion in the same direction as the film. Such apparent motion of the primary image becomes a real movement of the secondary image and can be matched in speed with the speed of the film by locating the primary image at just the right distance to the left of the film. In this manner, the blurring of the image exposed on the film because of the movement of the film during the exposure of each element of the image can be compensated.

*Case 2.*—Under the most convenient arrangement described for Case 2 above, with the film adjacent the secondary image moving in the same direction as the film adjacent the primary image, the movement of the elements of the secondary image must be in the same direction as the movement of the film adjacent the primary image. However, since lens 50, as disclosed in FIG. 1, must reverse the real motion of the image elements as seen in the secondary image (relative to the apparent motion of those image elements as seen in the primary image), the apparent motion of those image elements at the position of the primary image must be in the direction opposite from the motion of the film at that position. This reversal of direction, as compared with Case 1, is readily accomplished by focusing the primary image to the right of the film in FIG. 1 instead of to the left. The movement of the elements of the primary image which is caused by the action of the cylindrical lens then becomes real movement rather than apparent.

The size of the transverse dimension of the primary image is not important except that it must be within the limits of the transverse dimension of lens 22. The transverse dimension of the secondary image should have the same dimension as the desired transverse dimension of the image to be exposed on the film.

The preferred case of movement of the image of the focal-plane shutter in the plane of the secondary image in the opposite direction to the movement of the film at that position with $x=z=\frac{1}{2}y$ calls for a one-to-one ratio of size of longitudinal secondary image dimension to longitudinal primary image dimension. Both the primary and secondary transverse image dimensions can then be made equal to the desired transverse dimension of the image to be exposed on the film, and here again the image size ratio is unity. Hence, for this preferred case the ratio of transverse dimensions in the primary and secondary images is equal to the ratio between the primary and secondary longitudinal dimensions, and lens 50 may be composed entirely of spherical elements with a one-to-one image size ratio. Such a lens is usually composed of two ordinary photographic objective lenses placed front to front, with equal focal lengths, with the primary image at the principal focus of one lens and with the secondary image at the principal focus of the other.

The only required abnormality in the optical system is therefore in the objective lens 40 which forms the primary image.

The film may, if desired, be made much wider than the final desired transverse dimension of the images. This will allow the transverse dimension of the primary image to be much greater than the transverse dimension of the secondary image. Such a structure would have the advantage of requiring less distortion of the image dimensions where the values of r for the longitudinal dimensions of the primary and secondary images differ from unity.

Conventional spherical lenses can be used for both objective lens 40 and condenser lens 50 which provide the required longitudinal dimensions on both the primary and secondary images, and the final transverse dimension of the image exposed on the film can be what it will. Here, the final image is distorted in its dimensions, but is perfectly sharp and clear. In most cases, the images are used for making measurements. It is only necessary to apply different scales to dimensions measured in the longitudinal and transverse directions. If it is desired to project the pictures and view them as a motion picture, the distortion is then undesirable, although such images can be reprinted with a specially designed printer which is optically corrected to compensate for the distortion in the final print.

*Alternative embodiments*

Figure 4:
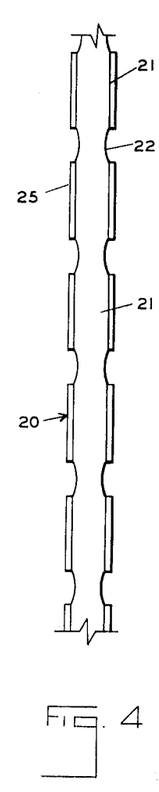
FIG. 4 is an edge view showing on an enlarged scale that portion of the film of FIG. 1 which is nearest the objective lens of the camera.
Figures 5, 6:
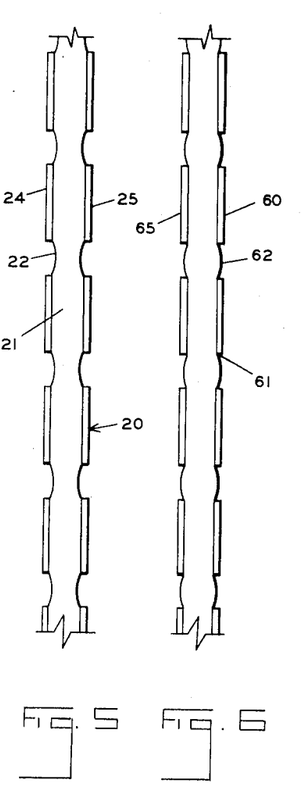
FIG. 5 is an edge view showing on an enlarged scale that portion of the film which is farthest from the objective lens.
FIG. 6 is an edge view similar to FIG. 4 showing an alternative embodiment of the film used in my invention.

The embodiment of my film strip seen in FIG. 6 shows a filmstrip 60 have frame portions 61 with a photosensitive surface 64 and an opaque surface 65 and transparent lens portions 62 intermediate frame portions 61. Filmstrip 60 is identical to strip 20 of FIG. 4 except that lens portions 62 are formed with a double convex configuration. The operation of filmstrip 60 is substantially identical to that previously described herein for strip 20 except that in any case it is necessary to position the primary image of camera 10 on the opposite side of strip 60 from the position of the primary image relative to strip 20.

Figure 7:
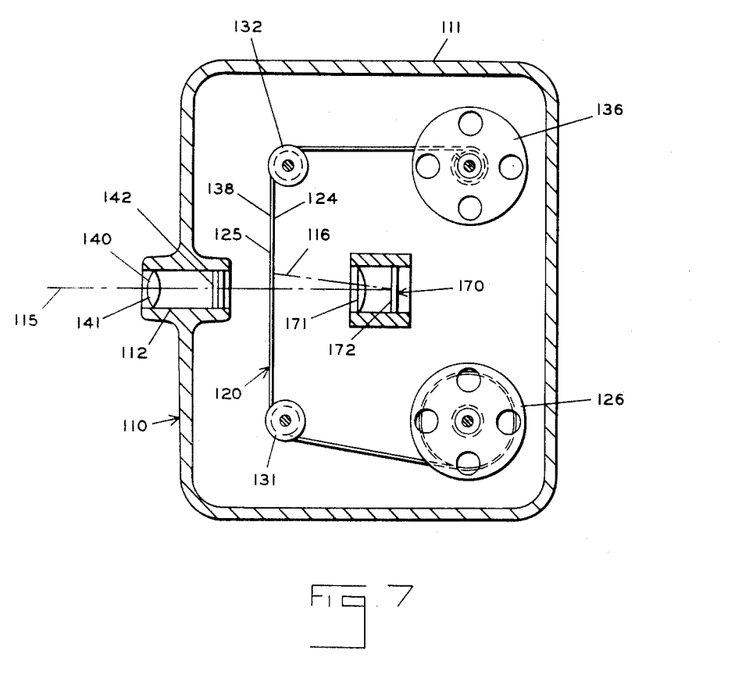
FIG. 7 is a side view in section showing an alternative embodiment of my invention.

In the embodiment of my camera shown in FIG. 7, I provide objective lens means 140 having elements 141 and 142 disposed along optical axis 115 along which light is permitted to enter camera 110 through opening 112. Lens means 140, supply and take-up spools 126 and 136 and filmstrip 120 are similar to corresponding features 40, 26, 36 and 20 shown in the embodiment of FIG. 1 and previously described. In this alternative embodiment, I provide, in place of condensing lens means 50 (of FIG. 1), means 170 which comprises condensing lens 171 and reflecting surface 172 angularly disposed with respect to axis 115 for refracting and reflecting light rays received along axis 115 and projecting said rays along axis 116. Means 170 is suitably formed and adjusted for producing a secondary image in the plane of sensitized side 124 of portion 138 of strip 120 and for moving various elements of said image, in the manner previously described, in the same direction as portion 138 is moved from film guide 131 to film guide 132.

In the operation of the alternative embodiment shown in FIG. 7, light entering camera 110 through opening 112 is focused by objective means 140 to form a primary image which is distorted by foreshortening or lengthening in the longitudinal dimension of strip 120. The primary image is focused in a plane which is disposed adjacent strip 120 and perpendicular to axis 115. Light entering opening 112 along axis 115 is at times prevented from further progress along axis 115 by the opaque coating on side 125 of each frame of film. When a lens portion of strip 120 intercepts such rays of light, they are transmitted toward means 170 and motion is imparted to them in the manner previously described. Means 170 is suitably formed and adjusted to provide conjugate foci in the plane of the primary image and in the plane of the secondary image. As a lens of strip 120 is drawn across axis 115, the light transmitted by said lens is refracted and reflected by means 170 and is moved across a sensitized surface of strip 120.

During such motion, the action of means 170, in coordination with the action of a lens element of filmstrip 120, performs the same two functions of focal-plane shutter action and optical compensation as described in the first embodiment, moving image elements in the same direction and at the same speed as filmstrip 120 and moving the focal-plane shutter, as seen in the secondary image, at a speed sufficient for exposing an undistorted photographic image on the sensitized surface of strip 120.

It is readily apparent to one schooled in the art that reflecting surface 172 may be either substantially plane, spherical, spheroidal or parabolic in configuration, and surface 172 may be either employed as the sole optical element of means 170 or in combination with one or more suitable lens elements without departing from the scope of my disclosure.

The film or shutter 20 is a movable filmstrip, yet it has features of novelty and is not entirely a conventional film and is of special construction. The film is of standard material and thickness and is in this sense a conventional film. However, it is not conventional in another sense in that it is specially constructed as shown in FIGS. 3, 4, 5 and 6. The filmstrip itself is a conventional transparent tape substantially identical with the transparent tapes which are generally designated as photographic film. Instead, however, of having one or both sides entirely coated with a photographic light-sensitive emulsion, it has spaced portions as are shown at 24 coated with photographic light-sensitive emulsion and portions between the coated portions uncoated and therefore entirely transparent as at 22. The portions of the filmstrip opposite the portions which are coated with photographic light-sensitive emulsion are coated with an opaque coating as at 25 so that light does not pass through the film at the coated portions. The intermediate lens portions as at 22 are, as stated, integral with the filmstrip, but are formed with arcual surfaces, either concave as shown in FIGS. 4 and 5, or convex as shown in FIG. 6. These arcual surfaces thus form lenses by reason of their concavity or convexity. The film strip could be formed with these arcual surfaces as it is initially manufacutred or can be formed by pressing, cutting, or shaving after the filmstrip has been initially formed. One method of forming the strip is a part of the invention as claimed herein and is later described more in detail. A transparent material, when cut in arcual form (as is well known by those skilled in the art), becomes a lens.

A further word of description may be given to lens 40 comprising the crossed, cylindrical lenses 41 and 42. These crossed lenses are provided for the purpose of projecting a foreshortened image. Devices for projecting a foreshortened image distorted relative to the object (in that a different ratio exists between the horizontal and the vertical dimensions of the primary image and the corresponding dimensions of the object) are well known in the art and are available commercially. Details of this type of device are not claimed herein (being old in the art) and the details of it are not a part of my invention. The devices which are available commercially are relatively complicated and for the purpose of explaining the invention I have described and shown a relatively crude device (i.e., the two crossed cylindrical lenses) which is capable of producing the desired foreshortening of the image but is not as finished a device as the complicated devices presently available for that purpose. Other devices designed for the same purpose are believed to be disclosed in the prior art. Such other devices as shown in the patent art can be used instead of the crossed cylinders actually illustrated in the application. Further details concerning this matter are set out above in column 4 hereof.

The relationship between the objective lens, the lens formed on the film, and the lens 50, is one which competent persons skilled in the art of optics can determine without any difficulty. For instance, the computed distance of the primary image from the film is dependent upon the type of film and size, index of refraction of the film, the dimensions of the frame as exposed on the film, the thickness of the film, the dimensions of the primary image formed by a standard amorphic commercial lens, of the aspect ratio of the lens, and the dimensions of the cylindrical lens surfaces of the film strip. For example, however, and without limitation, inasmuch as the conditions would vary depending on related conditions, applicant computes below the desired distance of the primary image from the film based upon certain assumed conditions. It is to be emphasized, however, that this is an example only and does not apply in all cases. The example will refer to the device of FIG. 7 (similar principles would be used in choosing dimensions for FIG. 1). Assume 16 mm. film having an index of refraction of the film of 1.50. Assume dimensions of the frame as exposed on the film of a height of 0.29", and a width of 0.40". Assume the thickness of the film to be 0.008". Assume the dimensions of the primary image to be formed by a standard amorphic commercial lens of 2:1 aspect ratio (lens 140 of FIG. 7) to be a height of 0.145" and a width of 0.40". Assume that the surfaces of the cylindrical lens of the film 120 (corresponding to the lens 22 of the film 20) have a height (in the direction of the movement of the film) of 0.01", and have a depth of 0.0005", then the computed desirable distance of the primary image from the film would be 0.024". The velocity of the movement of each element of the primary image during the exposure of that element for the dimensions given would be of the same speed but in the opposite direction as the movement of the film (i.e., as the movement of the cylindrical lens surfaces corresponding to the lens surface 22). The distance from the film 120 to the lens 171 may be of any magnitude large relative to the dimension of 0.024". The focal length of the lens 171 must be approximately equal to the distance of the lens from the film. The distance from the lens 171 to the reflecting surface may be of any magnitude.

Although the primary image as formed in the vicinity of the film by the objective lens 140 is foreshortened, the increment of that image that passes through the lens 22 is in this case restored by the lens 22 to an undistorted condition so that it becomes an increment of an undistorted or unforeshortened image which is moving in a suitable direction and at a suitable speed to provide the necessary optical compensation at the position of the final image on the film. The conditions described above necessarily follow, as will be seen by persons skilled in the art, from all the conditions that were stated above.

The following relations are well known to persons skilled in the art. Where $p$ is the distance from the lens to object, $q$ is the distance from the lens to image, $f$ is the focal length of the lens, A is a linear dimension of the object, and B is the corresponding linear dimension of the image, then $A/B$ equals $p/q$ and $1/f = 1/p$ plus $1/q$. The positions of object and image upon which the values of $p$ and $q$ are based are known in the art as conjugate focuses of the lens. As is well known in the art, an infinite number of pairs of conjugate focuses exist for any lens. A position at a distance $f$ from the lens is known in the art as the principal focus of the lens. The principal focus is the position at which the lens will focus light rays that have come to the lens from an object at an infinite distance. As is well known to persons skilled in the art, the above stated relations apply to cylindrical lenses as well as spherical lenses. However, with a cylindrical lens, the conjugate focuses must refer only to focuses of light rays in the direction of curvature of the lens without regard to focus of those rays in the direction at right angles to the curvature of the lens. With the cylindrical lens also, the principal focus must refer only to focus of light rays in the direction of the curvature of the lens without regard to the focus of the rays in the other direction. Also, the dimensions A and B must be measured, in the case of a cylindrical lens, in the direction of the curvature of the lens.

*Alternative embodiment*

Figure 8:
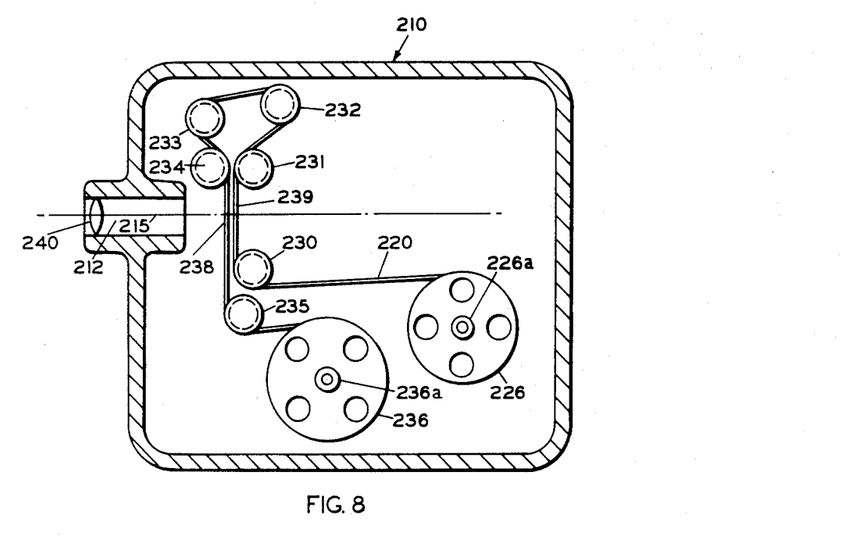
FIG. 8 is a view in vertical section showing another alternative embodiment of my invention which is quite similar to the embodiment shown in FIG. 1.
Figure 9:
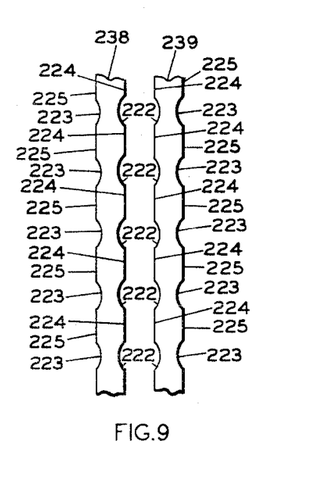
FIG. 9 is an edge view showing on an enlarged scale portions of the film of FIG. 8 adjacent to the optical axis of the camera shown in FIG. 8.

In the embodiment of my camera shown in FIGS. 8 and 9, I provide an objective lens 240 disposed along an optical axis 215 along which light is permitted to enter the camera 110 through opening 212. Lens means 240 may be similar to corresponding lens 40 or may be any other desired lens of the prior art suitable for the purpose of producing the required foreshortening. Supply spool 226 and take-up spool 236 mounted respectively on axles 226a and 236a are similar to the corresponding spools shown in the embodiment of FIG. 1, and previously described. The film-strip 220 is similar to the film-strip 20 shown in the embodiment of FIG. 1. After leaving the supply spool 226, the film 220 passes over rollers 230, 231, 232, 233, 234 and 235. Axles 226a and 236a and rollers 230, 231, 232, 233, 234 and 235 are all attached to the frame 210. In FIG. 9 are shown enlarged views of the portions of photosensitive film 220 that are designated 238 and 239 in FIG. 8. As shown in FIG. 9, on one side the film has photosensitive flat surfaces 224 located between cylindrically curved transparent surfaces 222. On the other side, the film has opaque surfaces 225 each located opposite one of the surfaces 224 and between cylindrically curved transparent surfaces 223.

Figure 10:
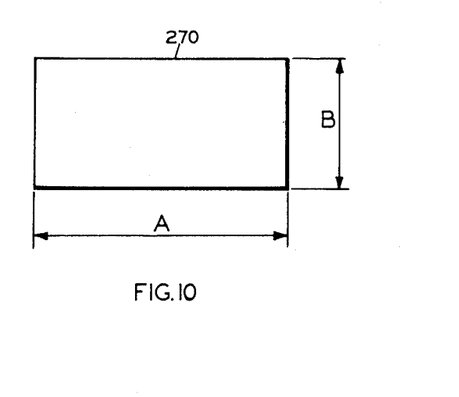
FIG. 10 is a view showing diagrammatically the outlines of an image formed by the objective lens of the camera of FIG. 8.

FIG. 10 shows the general shape of a rectangular image 270 formed by the lens 240. The dimensions B in FIG. 10 is foreshortened by characteristics built into the lens 240 in such manner that dimension B has one-half its proper magnitude compared with dimension A.

The lens 240 is so located and oriented relative to film portions 238 and 239 that it will focus a sharp image 270 of the object that is to be photographed on photosensitive flat surfaces 224 in film portion 239 by means of light rays passing through transparent cylindrically curved surfaces 223 and 222 in film portion 238. The lens 240 is also so oriented relative to film portions 238 and 239 that the image dimension B as seen in FIG. 10 will extend in the same direction as the movement of film portions 238 and 239 in their transport over rollers 230 and 231 and 234 and 235 respectively.

The distances between film portions 238 and 239 and the curvatures of cylindrically curved surfaces 222 and 223 are given such magnitude that each ray of light passing through the transparent cylindrically curved surfaces 222 and 223 of film portion 238 will be rotated in a counterclockwise manner by the movement of film strip portion 238, such rotation being about a stationary center located within the film portion 238 and such rotation being at a suitable rate to cause the ray of light to fall approximately on an unchanging position on flat photosensitive surface 224 of film portion 239 in spite of the continuous movement of said film portion 239.

The scanning effect produced by a pair of cylindrically curved surfaces 222 and 223 in passing across image 270 combined with simultaneous movement of film portion 239 causes the image 270 exposed on the photosensitive flat surface 224 of film portion 239 to have the dimension B increased two-fold. As the dimension A remains unchanged, the image 270 as exposed on flat photosensitive surface 224 of film portion 239 has the dimension B properly proportioned relative to dimension A.

Figures 11, 12:
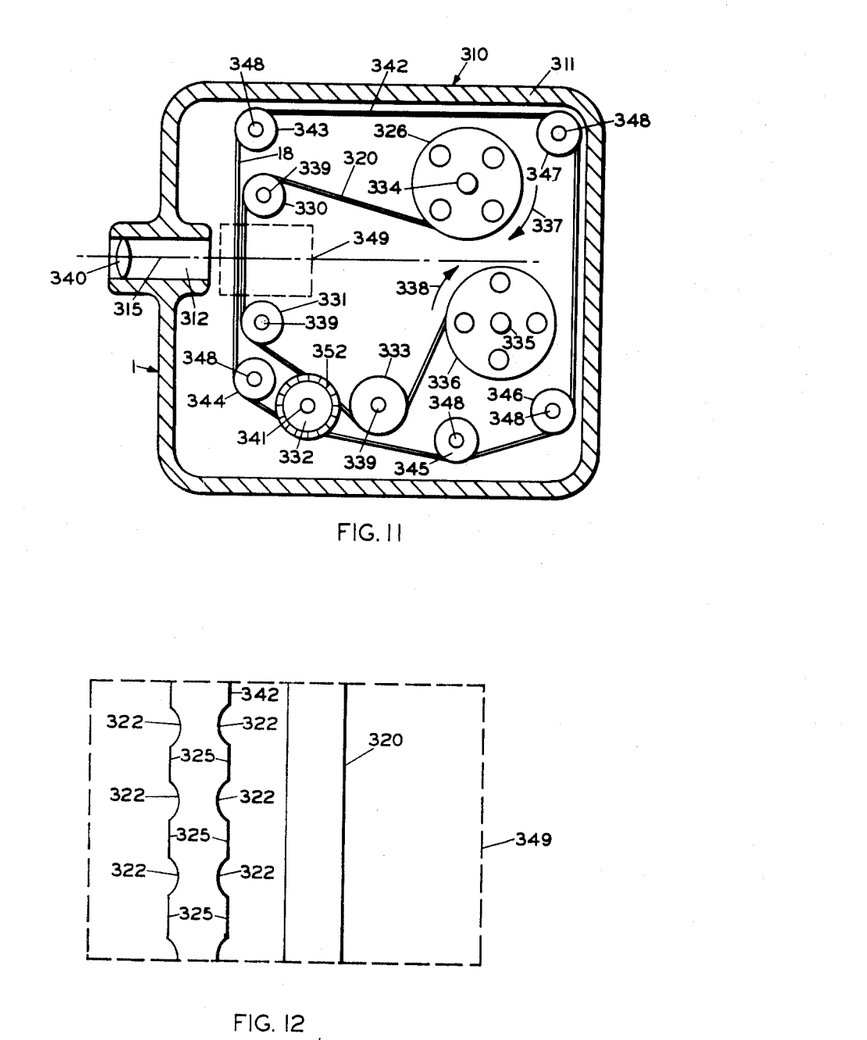
FIG. 11 is a view in vertical section showing another embodimnet of my invention illustrating a camera having (1) a film upon which the images formed thereon are reproduced, and (2) a separate film which is driven at the identical speed of the first named film, which serves as a shutter and as an optical compensator and which is formed as an endless belt.
FIG. 12 is an edge view on an enlarged scale of a portion of the view of FIG. 11.

In the embodiment of my camera shown in FIGS. 11 and 12, I provide an objective lens means 340 disposed along an optical axis 315 along which light is permitted to enter the camera 310 through opening 312. A supply spool 326 and take up spool 336 and a film strip 320 are provided and lens means 340, supply and take up spools 326 and 336 and the film strip 320 are similar to corresponding features 40, 26, 36 and 20, shown in the embodiment of FIG. 1 and previously described.

FIG. 11 is a side elevational view of the device with the frame 311 of the camera 310 in vertical section. The objective lens 340 is mounted in the frame 311. Standard photosensitive motion picture film 320 passes from the standard supply spool 326 over rollers 330 and 331, sprocket 332, and roller 333 to a standard take up spool 336. Supply spool 326 and take up spool 336 are mounted as by means of spindles 334 and 335 inside of frame 311. Spindle 334 may or may not be driven by motive means not shown. Motive means, not shown, drives take up spool 336 by means of spindle 335 in the direction of arrow 338.

Rollers 330, 331 and 333 are rotatably mounted inside of the frame 311 by means of spindles such as spindles 339. The sprocket 332 is mounted on a spindle 341. The spindles 339 and 341 are secured inside the frame 311. The rollers 330, 331 and 333 and the sprocket 332 are preferably free to rotate as they may be impelled by the film 320. They may have motive power applied to them by means not shown, through the spindles 339 and 341. In addition, I provide a continuous loop 342 of a special type film (later to be described). This loop 342 passes over rollers 343, 344, 345, 346 and 347. These rollers 343, 344, 345, 346 and 347 are rotatably mounted inside the frame 311 by means of spindles such as spindles 348. The rollers 343, 344, 345, 346 and 347 may or may not be driven by motive means, not shown, through spindles 348.

The portion of standard photosensitive motion picture film 320 and a portion of the continuous loop 342 of a special type of film, that appear in FIG. 11 within the dashed outline 349 are shown greatly enlarged in FIG. 12. As shown in FIG. 12 the film loop 342 is provided with transparent cylindrically curved surfaces 322 on both sides. Alternatively, on one side or the other, of film 342, the curved surfaces 322 could be replaced by transparent regions covering the same part of the film surface as the curved surfaces 322 but having a different radius of curvature or flat instead of curved.

The distance between adjacent cylindrically curved surfaces 322 of film 342 is the same as the distance between adjacent sprocket perforations of film 320. Film 342 is also provided with standard sprocket perforations spaced in the same manner as the film 320.

On the special film 342, all flat surfaces 325 as shown in FIG. 12 located between cylindrically curved surfaces 322, are opaque, on both sides of the film.

The objective lens 340 is of the type known as anamorphic in that it is constructed in such a manner that the dimension of the image formed by the lens in the direction of film movement will have one-half the correct magnitude relative to the dimension measured at right angles to the direction of the motion of the film.

The image formed by the lens 340 is identical with the image 270 shown in FIG. 10. As seen in FIG. 10, the dimension B has one-half its correct magnitude relative to dimension A. The lens 340 is so positioned in frame 311 that the image 270 of the lens 340 falls on the photosensitive surface of film 320, but only to the extent that the light from lens 340 is able to reach film 322 by passing through cylindrically curved transparent surfaces 322 of film 342. The sprocket teeth 352 of sprocket wheel 332 engage the sprocket perforations of both film 320 and film loop 342. Any motive power applied to any of the rollers 343, 344, 345, 346, or 347 is kept at a magnitude low enough that proper engagement of the sprocket teeth 352 with both film 320 and film 342 will not be prevented. For that reason both film 320 and 342 will at all times pass through the dashed outline area 349 of FIG. 11 synchronously at the same speed and in opposite directions.

With the two films 320 and 342 moving in the manner described, each pair of cylindrically curved surfaces 322 (one on one side of the film 342 and the other on the other side) will scan the image 270 in such a manner as to provide a complete exposure of the image on the film 320. Because each of the two films moves the distance of dimension B of FIG. 10 during the scanning process, the image 270 as exposed on the film 320 has a dimension B twice as great as shown in FIG. 10.

During the scanning process the moving curved surfaces 322 refract the rays of light passing through those curved surfaces from lens 340 in a varying manner but such that any given ray of light will continuously fall approximately on an unvarying spot on film 320. In this manner, blurring of exposure of image 270 on film 320 is avoided in spite of the continuous movement of film 320.

It is believed that the inventions may be more easily understood by reference to applicant's prior Patent 2,400,885.

In said prior patent in the embodiment shown in FIG. 1, a stationary objective lens 8 is used to form a primary image at the position of the prisms 5 (at the intersection of the axes A—A and B—B) and the light beams are reflected by these prisms which forms light beam inverting mechanisms. In the embodiment shown in FIG. 6 of the prior patent the objective lens 116 forms a primary image at the position of the prisms 113 which form light beam inverting means and transmit the light rays through said prisms 113. Due to the motion of the prisms 5 (or 113) the apparent image receives a translatory motion such as to give it an appearance of having come from a primary image moving in the same direction as, and at twice the speed of, the prisms 5 (or 113). This reflected or transmitted beam passes through a lens system 9 and 10 (or 117 and 118) so designed as to form a secondary image on a continuously moving film. The lens system 9–10 (or 117 and 118) is so designed that the speed of the secondary image relative to the apparent speed of the primary image will be such that the secondary image will move at a speed equal to that of the film. By using a reduction ratio of approximately 1:2 between secondary and primary images, the film (carried by the same drum as the prisms) moves at the same rate as the prisms and also at the same rate as the secondary image (see Patent 2,400,885, page 2, col. 1, lines 9–40).

In this application the lens 40 (or 140, 240 or 340) corresponds to the lens 8 of the patent. The lenses 22 (or 62, 222, 223, 322) correspond to the prisms 5 (or 113) of the patent, the focusing lens 50 (or 170) corresponds to the lens system 9–10 of the patent, and the portion 39 or 239 or 339 of the film corresponds to film 6 of the patent.

In all of the embodiments shown in this application, a plurality of cylindrical lenses (22 or 62, 222 or 322) impart apparent motion to the images so that this motion corresponds to the motion of the film at the position at which the rays of light strike the sensitized film. Either such a lens, or a prism or some such device, is necessary to create this apparent motion, but in this application applicant uses cylindrical lenses. But cylindrical lenses create not only apparent motion but also either expansion of the image or foreshortening of the image in the direction of the curvature of the lens. This expansion or foreshortening of the image by the lenses 22 (or 62, 222 or 322) may be corrected by a lens placed before the lenses 22 or 62, 222 or 322 (such as for example the lens 40) or by a lens placed after the lenses 22 or 62, 222, or 322 (such as for example the lens 50 or lens 171).

In one embodiment the primary image is reduced in size (foreshortened) in its vertical dimension by the lens system 40, before it is transmitted to the mechanism for giving motion to the ray (e.g. one of the lenses 22). Then the foreshortened image is restored in its vertical dimension by the lenses 22 (positioned then at the portion of the film 38) at the same time that the lens 22 is giving motion to the image so that it will move at the same speed as the sensitized portion of the film at the position of the portion of the film 39.

It might be helpful to review more in detail the action of the two types of lenses 22 and 62 shown in connection with FIGS. 1–6.

If the primary image is formed by the lens system 40 to the left of the concave cylindrical lens 22, the lens 22 will contract the primary image in one dimension (the vertical dimension) and will move the apparent primary image as seen from the refocusing lens 50 in the same direction as the movement of the lens 22. The focusing lens 50 causes the secondary image to move in opposite direction to the apparent motion of the primary image (i.e. they move in the same direction as the motion of the portion 39 of the film).

If the primary image is formed to the left of the convex cylindrical lens 62, the lens 62 will expand the apparent primary image in the vertical dimension and cause it when viewed from the refocusing lens 50 to appear to move in the opposite direction to the movement of the lens 62. The refocusing lens 50 will cause the secondary image to move in the opposite direction to the apparent motion of the primary image (i.e. to move upward in FIG. 1).

If the primary image is formed to the right of the concave cylindrical lens 22, the lens 22 will expand the apparent primary image in the vertical dimension and cause it when viewed from the refocusing lens 50 to appear to move in the opposite direction to the movement of the lens 22. The refocusing lens 50 will cause the secondary image to move in the opposite direction to the apparent motion of the primary image (i.e. to move upward in FIG. 1).

If the primary image is formed to the right of a convex cylindrical lens 62, the lens 62 will contract the apparent primary image in the vertical dimension, and cause it when viewed from the refocusing lens 50 to appear to move in the same direction to the movement of the lens 62. The refocusing lens 50 will cause the secondary image to move in the opposite direction to the apparent motion of the primary image (i.e. to move in the same direction as the motion of the portion 39 of the film).

If the primary image is formed in the plane of movement of the concave cylindrical lenses 22 (or the convex cylindrical lenses 62), the lenses will neither contract nor expand the primary images nor cause them to move in either direction.

With the above in mind, it can be seen that the direction and rate of movement depend on the type of lens used in the film 20 (whether concave lenses 22 or convex lenses 62) and the distance from the primary image to the plane of the portion 38 of the film. The amount of foreshortening or expansion in one direction of the image depends on the curvature of the lenses 22 or 62 and this foreshortening or expansion can be readily compensated for by lenses 40 and/or 50.

The computation of the various dimensions of the various elements of applicant's device are readily made by persons skilled in the art. For example, most of these factors may be computed from the following formulae which are set out below and which will be explained as we proceed:

(1) $$\frac{1}{f} = (n-1)\left(\frac{1}{r_1} + \frac{1}{r_2}\right)$$

and if $$r_1 = r_2$$

then $$\frac{1}{f} = (n-1)\left(\frac{2}{r}\right)$$

(2) $$\frac{1}{p} + \frac{1}{q} = \frac{1}{f}$$

These equations are given in most modern books on physics.

Figure 3:
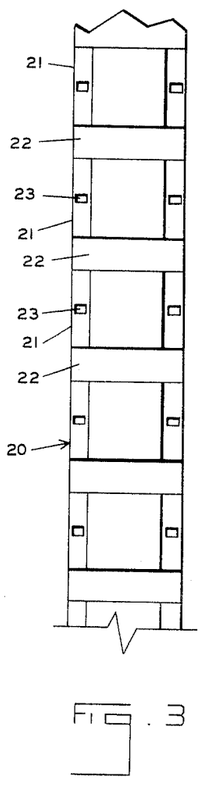
FIG. 3 is a plan view showing a portion of the film shown in FIG. 1 on an enlarged scale.

Because of the desirability of using standard film, applicant prefers to start the computations with a film of a certain thickness and having lenses formed therein having a fairly shallow curvature as shown in FIGS. 3, 4 and 5, and having an index of refraction corresponding to a film of standard composition. Then $$f = \frac{r}{2(n-1)}$$

from 1 above where $r =$ the radius of curvature of the lens 22 (or 62) and where $n =$ the index of refraction of the film.

It is obviously desirable that the primary image be positioned close to the lens 22 (or 62)—either to the left of the lens or to the right of the lens depending on whether a concave lens or a convex lens is used and whether it is desired that the secondary image move in the direction of the movement of the film portion 38 or in the opposite direction as fully discussed above. The distance of the primary image from the lenses 22 (or 62) may be designated $p$ and the distance of the primary image as modified by the lens 22 (or 62) from the lens 22 (or 62) may be designated $q$.

Therefore, if we assume $p$ as any small convenient distance, $q$ may be computed as follows:

$$q = \frac{fp}{p-f}$$

from 2 above.

The velocity of the lens 22 (or 62) equals the velocity of the movement of the film 20 (or 120) and may be designated $V_1$. The primary image is stationary, but its velocity relative to the lens 22 (or 62) will be the negative of the velocity of the lens itself or $-V_1$, and the primary image as modified by the lens 22 (or 62) of the moving film 20 has a velocity relative to the lens 22 (or 62) which may be designated $V_2$, and the absolute velocity of movement of this primary image as modified by the lens 22 (or 62) which is also its velocity of movement relative to the refocusing lens 50 (or 171) may be designated $V_3$. Finally, we may designate the velocity of movement of the secondary image at the portion 39 of the film 20 as $V_4$. But since $V_1$ equals the velocity of the moving film, we want $V_1$ to equal $V_4$. Now by elementary optics:

$$\frac{V_4}{V_3} = \frac{d_2}{d_1}$$

where $d_1$ is the distance between the refocusing lens 50 and the position of the primary image as modified by the lens 22 (or 62) (i.e. the distance from the refocusing lens 50 to the lens 22 (or 62), plus or minus, as the case may be), the distance $q$ computed above, and where $d_2$ is the distance between the refocusing lens 50 and the position of the secondary image or the portion 39 of the film 20.

From the above:

$$\frac{V_2}{-V_1} = \frac{q}{p}$$

$$V_2 = (-V_1)\left(\frac{q}{p}\right)$$

$$V_3 = (-V_1)\left(\frac{q}{p}\right) + V_1 = V_1\left(1 - \frac{q}{p}\right)$$

$$\frac{d_2}{d_1} = \frac{V_4}{V_3}$$

and since $V_4$ must equal $V_1$ $$\frac{d_2}{d_1} \text{ must equal } \frac{V_1}{V_3} = \frac{V_1}{V_1\left(1-\frac{q}{p}\right)} = \frac{1}{1-\frac{q}{p}} = \frac{p}{p-q}$$

While the above computations have been applied to the embodiments of FIG. 1 and 7, they apply also (except for the refocusing lens 50 of embodiment 1 and the refocusing and reflecting lens 170 in embodiment 2) to the embodiments of FIGS. 8 and 9, and FIGS. 11 and 12, and by the same principles, the distances between sections 238 and 239, and between 342 and 320 may be readily computed from the index of refraction of the film selected, and the radius of curvature of the lenses 222, 223 and 322 selected.

The machine illustrated in FIGS. 13, 14 and 15 for forming film such as film 20, 120, 220 and 342 and the method of forming such film will now be described. The purpose of the machine illustrated and the process described is to transform ordinary motion picture film into film having transparent cylindrical lens portions for use in motion picture cameras including such film for use in the new and improved type of motion picture cameras described heretofore in this application.

Figure 13:
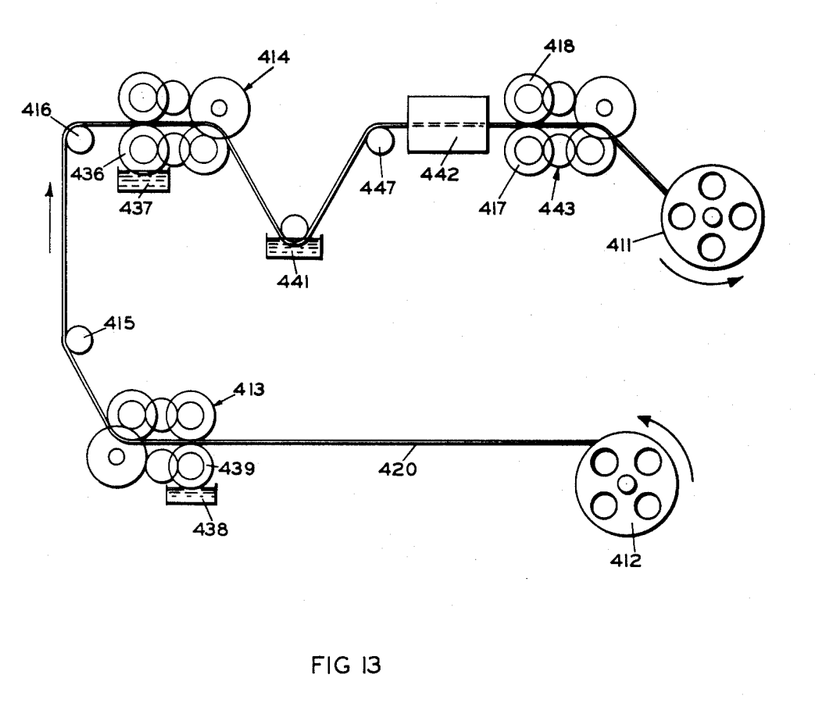
FIG. 13 is a view in elevation (but largely diagrammatic) showing a machine for forming the film used in my invention by converting conventional film to film appropriate to serve as a shutter for my camera and appropriate to serve as an optical compensator therefor.
Figure 14:
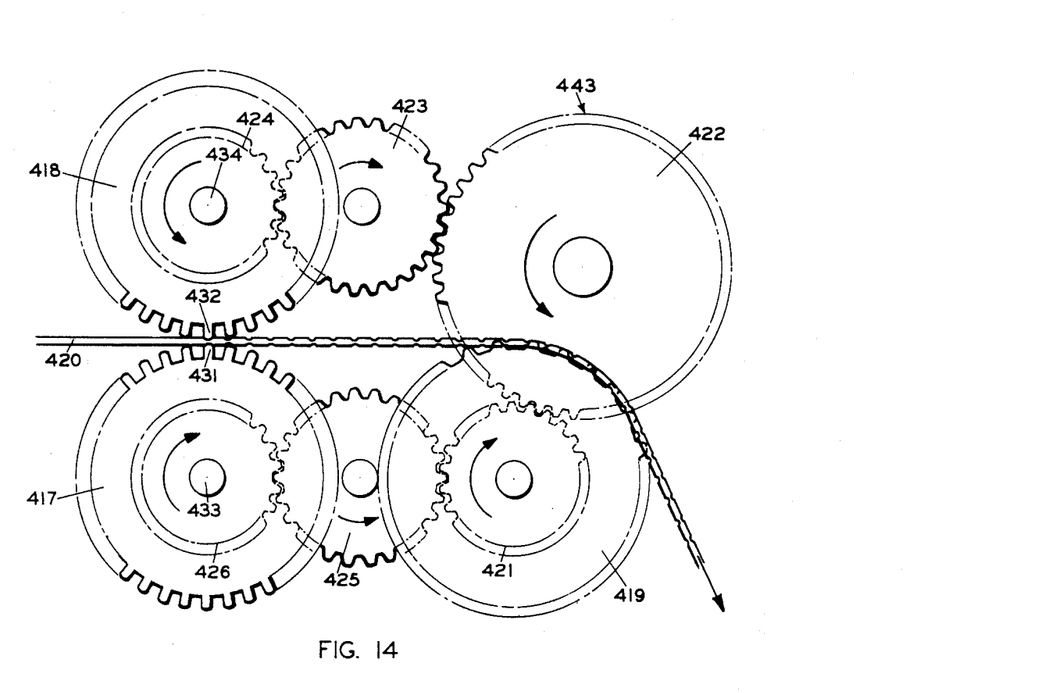
FIG. 14 is a diagrammatic view in elevation of a portion of the machine illustrated in FIG. 13 shown on an enlarged scale.
Figure 15:
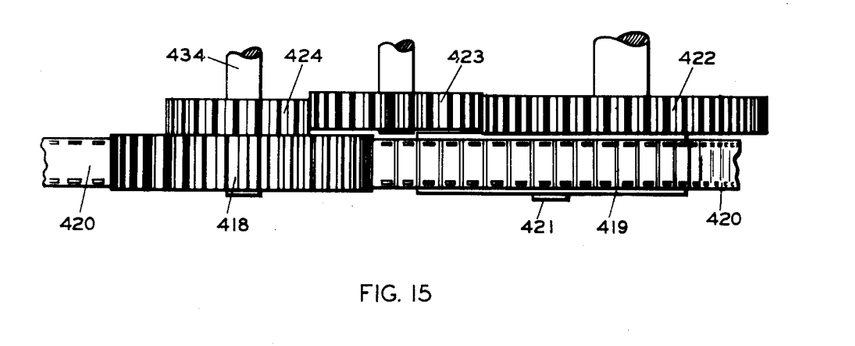
FIG. 15 is a view in top plan of the portion of the machine shown in FIG. 14.

A strip of film upon which transparent lenses are being produced is designated 420 in FIGS. 13, 14 and 15. The film is initially ordinary transparent flexible plastic tape having one side coated with a photosensitive emulsion and having the other side coated with an opaque coating which prevents the passage of light therethrough. The film is drawn through the machine from a supply spool 412 by any suitable means such as for example by a take-up spool 411. In being drawn through from the supply spool 412 to the takeup spool 411 the film 20 passes through several operating devices including devices 413, 414 and 443 and is guided thereto by suitable idler rollers such as for example 415, 416 and 447. The devices 413, 414 and 443 are substantially identical and description of one will suffice in general for all. The device 443 is shown more in detail in FIGS. 14 and 15. Therein it may be seen that the film is drawn through the device between two paddle wheels 417 and 418. Sprockets on a sprocket wheel 419 engage the perforations of the film and are geared to paddle wheels 417 and 418 by gears such as 421, 422, 423, 424, 425 and 426 in such manner that the paddles, such as for example, paddles 431 and 432 on the wheels 417 and 418 when they come into contact with the film 420 will move in the same direction and at the same speed as the film, while the paddle wheels 417 and 418 will turn in opposite directions. The paddles 431 and 432 on paddle wheels 417 and 418 are so spaced that one paddle of one wheel will come into contact with the film 420 for each pair of perforations on the film 420. Also, the paddles 431 and 432 on paddle wheels 417 and 418 are so spaced that the paddle 431 on paddle wheel 417 will always fall on the film directly opposite to a paddle 432 on paddle wheel 418. Paddle wheels 417 and 418 are mounted on shafts 433 and 434.

A tank 437 is provided under paddle wheel 436 of device 414 and a tank 438 is provided under paddle wheel 439 of device 413 which correspond respectively to paddle wheel 417 of device 443. The tanks 437 and 438 are filled with a developing solution or a fixative solution as the case may be. This solution in tank 437 is at such a level that each paddle (such as for example, paddles corresponding to paddle 432) dips into it every time the paddle wheel 436 turns around. So also paddles on paddle wheel 439 dip into solution in tank 438, each time the wheel 439 turns around. The film 420 may be drawn through as many of the devices (such as the devices 413 and 414 shown in FIG. 13) as may be needed one after another. After having been drawn through a sufficient number of such devices as shown in FIG. 13, all arranged in such manner that the paddles corresponding to paddles 431 and 432 of one such device will fall on the film at the same position as the corresponding paddles of all the other such devices, both the photographic emulsion on one side of the film and the opaque backing on the other side of the film will dissolve away in the developing solution and fixative solution and the desired film having alternative transparent and opaque portions such as film 420 will be produced. Both photographic emulsion and opaque back coating, however, will still remain on the film in the intervals between the portion where the various paddles 431 and 432 were in contact with the film.

The film will next be drawn through a suitable water bath 441 for the purpose of washing away residual developing solution or fixated solution.

The film will then be drawn through a suitable drier 442. After drying, the film will be drawn through the device 443. Device 443 has no containers such as 437 and 438 nor the solutions therein. In this device 443 the end of each paddle 431 and 432 has a suitable curved surface where it comes into contact with the film 420 to imprint upon each side of the film 420 a desired cylindrical curvature. The paddle wheels 417 and 418 and the paddles 431 and 432 of this paddle device 443 will be maintained at a suitable high temperature for best results in imprinting the desired curved imprints on the film. The spacing between the axles 433 and 434 in this final device 443 will be correct to cause the paddles 431 and 432 thereof to imprint to the desired depth in each surface of the film 420. The final device 443 will be arranged in such a manner that the paddles 431 and 432 thereof will fall upon the same film position as were previously made transparent by the action of the paddles 431 and 432 of the devices such as 413 and 414 through which the film was previously drawn.

It is obvious that for any reflector, lens or other optical element described herein with respect to any embodiment of my invention substitution may be made of a plurality of optical elements, some of which may be positive and/or others of which may be negative. Said elements may be suitably spaced and of suitable power for correcting various aberrations.

Wherever such substitutions of pluralities of optical elements may result in a substantially identical position for two or more optical elements, along a common optical axis, said two or more elements may be combined into one or more integral optical means.

It is to be understood that the above described embodiments of my invention are for the purpose of illustration only and various changes may be made therein without departing from the spirit and scope of the invention.

I claim:

1. A photographic shutter comprising a flexible strip having a plurality of focusing lenses formed integrally therewith and spaced along the length thereof, and having a plurality of opaque portions formed integrally therewith, spaced along the length thereof and positioned intermediate said lenses.

2. A camera having an optical axis and including a photographic focal plane shutter consisting of a flexible strip positioned to intersect the optical axis of said camera, having a plurality of transparent focusing lenses formed integrally therewith and spaced along the length thereof, and having a plurality of opaque portions, formed integrally with the lenses in the strip, spaced along the length of the strip and positioned intermediate said focusing lenses; and means for moving said shutter across said optical axis whereby the lenses of the shutter transmit and focus an intermittent series of images.

3. A structure according to claim 2 in which there is also included means for forming an optical image which is foreshortened in one dimension; in which the focal plane shutter includes means for progressively exposing successive portions of said image and includes means for correcting said foreshortening; and in which there is provided photosensitive film means synchronously movable with said shutter means whereby said film means is exposed to said optical image.

4. A camera structure according to claim 2 in which there is provided an objective lens disposed along said axis for creating an optical image in a plane traversed by said focusing lens.

5. A camera structure according to claim 2;
in which there is provided an objective lens through which light rays are admitted to said enclosure and are caused to pass along said optical axis to form images;
in which the opaque portions are coated with an opaque coating, in which the lenses form transparent portions positioned intermediate the coated portions;
in which guide means are provided for guiding the strip along a path in which it intersects said optical axis; and
in which the means for moving the shutter past the optical axis causes the alternate opaque and transparent portions of the strip to form a shutter for said camera and causes the lenses to focus the images for recording on photosensitized film.

6. A photographic film comprising a flexible strip having a plurality of transparent lenses formed integrally therewith and spaced along the length thereof, and a plurality of photosensitive portions also formed integrally therewith, spaced along the length thereof and positioned intermediate said lenses.

7. A photographic photosensitive film comprising a film strip and shutter for a camera having a plurality of lenses formed integrally therewith and spaced along the length thereof, having a plurality of opaque portions formed along the length of said film strip intermediate said lenses, and having a coating of photosensitive material provided on one surface of a plurality of said opaque portions.

8. A photographic apparatus comprising means for forming optical images which are foreshortened in one dimension to compensate for subsequent lengthening; focal plane shutter means for progressively exposing successive portions of said images; optical means for moving said images at a speed synchronized with the speed of the movement of said shutter means and coincidentally correcting said foreshortening by lengthening the images in the direction of their motion; and photosensitive film means synchronously movable with said shutter means and positioned to coincide with the images being moved by said optical means, said photosensitive film means is exposed to said moving corrected optical images.

9. The photographic apparatus of claim 8 comprising a camera in which:
a light tight enclosure is provided having an aperture
the optical means and the photosensitive film means comprise a photographic film having a plurality of transparent lenses formed integrally in said film strip and having a plurality of photosensitive portions positioned along the surface of said film strip;
means are provided for moving said film strip across said axes; and
the transparent lenses comprise means for correcting the foreshortening of the images and for forming undistorted secondary images and focusing such images upon said photosensitive portions.

10. The photographic apparatus of claim 8 in which:
the means for forming foreshortened optical images comprises an objective lens;
the optical means comprises a plurality of lenses formed integrally with said focal plane shutter means for moving the apparent position of said image, for modifying the foreshortening and for forming moving corrected secondary images.

11. A camera comprising a light-tight container having an opening through which light enters and having an opening through which light enters and having an optical axis intersecting said opening; a movable flexible, photographic film strip for said camera having a plurality of transparent lenses formed integrally therewith and spaced along the length thereof, and a plurality of photosensitive portions also formed integrally therewith, spaced along the length thereof and positioned intermediate said lenses; means for guiding said strip in said container so that it intersects said optical axis twice and so that as each transparent portion of said strip intersects said axis at a point relatively near to said opening, a photosensitive portion of said strip intersects said axis at a point further from said opening whereby said photosensitive portions are exposed successively to the light entering said opening.

12. A structure according to claim 11 in which there is provided objective lens means for forming an image in a plane perpendicular to said axis; and
in which there is provided another lens means disposed intermediate said film traversing points for projecting said image upon a photosensitive portion.

13. A camera structure according to claim 11 in which there is provided means comprising an objective lens disposed along said axis for forming a foreshortened primary image; and
in which the movable flexible photographic film strip having a plurality of transparent lenses comprises means for moving the apparent position of said image, for modifying said foreshortening and for forming a moving corrected secondary image adjacent to a photosensitive portion of said film.

14. A camera structure according to claim 11 in which there is provided means disposed along said axis for forming a foreshortened primary image substantially normal to said axis and adjacent to said film when one of said lenses first traverses said optical axis; and
in which there is also provided means for forming from said primary image an undistorted secondary image adjacent to said film at one of said photosensitive film portions.

15. A camera structure according to claim 11 in which there is provided means comprising an objective lens disposed along said axis for forming a foreshortened primary image in a plane substantially normal to said axis and adjacent to said film at a point where one of said lenses traverses said optical axis; and
in which there is provided means comprising said lenses of the film strip and an additional optical system for forming from said primary image a moving corrected secondary image adjacent to said film strip at one of the photosensitive portions.

16. A camera comprising
an essentially light tight enclosure having an optical axis and having an aperture through which light rays are admitted to said enclosure along said optical axis to create images in a plane perpendicular to said axis;
a photographic photosensitized film strip and shutter for said camera comprising a film strip having a plurality of lenses formed integrally therewith and spaced along the length thereof, having a plurality of opaque portions formed along the length of said film strip intermediate said lenses, and having a coating of photosensitive material provided on one surface of a plurality of said opaque portions;
means for guiding said strip along a path which intersects said optical axis to cause alternate opaque and lens portions to form a focal plane shutter for said camera and to cause the lenses to focus said images on successive photosensitive portions thereof for recording the images thereon.

17. The camera structure of claim 16.
in which there is provided an objective lens means aligned along said axis;
in which said means for guiding the film strip guides it to traverse the optical axis at a plurality of points; and
in which there is provided means for forming a plurality of optical images on planes perpendicular to said axis at points adjacent to said points at which the film strip traverses the optical axis, including a condensing lens means disposed along said axis intermediate said film traversing points and having one focal point adjacent to one of said image planes and adjacent to the point at which said optical axis is first traversed by said film strip, and a second oppositely directed focal point adjacent to another of said image planes and adjacent to the point at which said optical axis is last traversed by said film strip.

18. A camera structure according to claim 16 in which
an objective lens is provided positioned along said axis for forming said images
said film strip traverses said optical axis at a plurality of points including a point adjacent to the plane of the objective lens; and
means are provided including said objective lens, said film strip lenses, and a condensing lens disposed along said optical axis intermediate a pair of said film traversing points and having one focal point adjacent to the image plane formed by the film strip lenses and a second oppositely directed focal point in a plane adjacent to the point at which the film strip traverses the optical axis at the second of said film strip traversing points which is removed from said image plane, for forming a plurality of moving optical images on the plane perpendicular to said axis at a point adjacent to the second of said film strip traversing points.

19. The camera structure of claim 16 in which
there is provided an objective lens disposed along said optical axis for creating said images;
means are provided including said film strip lenses for projecting from the optical images formed by said objective lens a plurality of moving images on sucsive photosensitive portions of said film strip; and
said lenses form transparent portions intermediate the opaque portions.

20. The camera structure of claim 16 in which
there is provided an objective lens disposed along said axis for forming an image which is foreshortened in one direction and which is adjacent the point at which the film strip intersects said axis; and
there is provided means comprising a condensing lens and said film strip lenses for moving the apparent position of said images, for modifying said foreshortening, for forming moving corrected secondary images, and for focusing said corrected images upon said photosensitive portions.

21. A camera structure according to claim 16 in which:
there is provided an objective lens through which the light rays are admitted to said enclosure, and are caused to pass along said optical axis;
there is provided a supply spool positioned in said enclosure to which said film strip is connected;
there is provided a take up spool to which said film strip is connected for transport from said supply spool to said take up spool;
said means for guiding leads said film strip from said supply spool to said take up spool along a path which intersects said optical axis twice, first with its opaque side facing the incoming rays, and second with the photosensitive side facing the incoming rays; and
wherein the film lenses focus the images formed by said rays on the photosensitive portions of the film at the second intersection of the film with the optical axis.

22. A camera structure according to claim 16 in which:
there is provided an objective lens means aligned along said axis;
said film strip traverses said optical axis at a plurality of points; and
there is provided means, including a condensing lens also disposed along said axis intermediate said film strip traversing points for forming a plurality of optical images on planes perpendicular to said axis at points adjacent to said points at which the film means traverses the optical axis;
said condensing lens having one focal point adjacent to one of said image planes and adjacent to the point at which said optical axis is first traversed by said film strip and a second oppositely directed focal point adjacent another of said image planes and adjacent to the point at which said optical axis is last traversed by said photographic film means.

23. A photographic apparatus comprising means for forming optical images which are foreshortened in one dimension to compensate for subsequent lengthening; focal plane shutter means for progressively exposing successive portions of said image; optical means for moving said images at a speed synchronized with the speed of movement of said shutter means and coincidentally correcting said foreshortening by lengthening the images in the direction of motion; and photosensitive film means synchronously movable with said shutter means and positioned to coincide with the images being moved by said optical means whereby said photosensitive film means is exposed to said moving corrected optical images comprising a camera in which:
a light-tight enclosure is provided, having an aperture formed in said enclosure, said aperture being traversed by an optical axis;
the means for forming the foreshortened optical images comprises a primary lens disposed along said axis
the focal plane shutter means, the optical means and the photosensitive film means comprise a strip of flexible photographic film having a plurality of transparent lenses formed integrally therewith, a plurality of photosensitive portions intermediate the lens portions and having a plurality of opaque portions intermediate said plurality of transparent lenses wherein the lenses move the apparent positions of said images, modify the foreshortening and form moving corrected secondary images adjacent to the photosensitive portions of said film;
means are provided for moving said film and said lenses across said axis; and
wherein said strip of flexible photographic film is movably disposed for traversing said optical axis at a point adjacent to the images formed by said primary lens.

24. A photographic apparatus comprising means for forming optical images which are foreshortened in one dimension to compensate for subsequent lengthening; focal plane shutter means for progressively exposing successive portions of said image; optical means for moving said images at a speed synchronized with the speed of movement of said shutter means and coincidentally correcting said foreshortening by lengthening the images in the direction of motion; and photosensitive film means synchronously movable with said shutter means and positioned to coincide with the images being moved by said optical means whereby said photosensitive film means is exposed to said moving corrected optical images comprising a camera in which:
a light-tight enclosure is provided having an opening and having an optical axis traversing said opening,
the focal plane shutter means, the optical means, and the photosensitive film means comprise a film strip movably disposed within said camera intersecting said axis adjacent to said images, having a plurality of opaque portions formed thereon and spaced along one surface thereof, having a plurality of transparent lenses formed in said film strip intermediate said opaque portions, and having a plurality of photosensitive portions positioned along the surface of said film strip opposite to said opaque portions and intermediate said transparent lenses;
means are provided for moving said film strip across said axis; and
the transparent lenses comprise means for correcting the foreshortening of the images and for forming undistorted images upon said photosensitive portions.

References Cited by the Examiner

UNITED STATES PATENTS

| | | | |
|---|---|---|---|
| 721,954 | 3/1903 | Huet et al. | 352—117 |
| 727,948 | 5/1903 | Higgins | 352—115 |
| 923,827 | 6/1909 | Folmer | 95—42 |
| 1,261,886 | 4/1918 | Worthington | 352—57 |
| 1,341,543 | 5/1920 | Cardwell | 95—49 |

(Other references on following page)

UNITED STATES PATENTS

| | | | |
|---|---|---|---|
| 1,414,942 | 5/1922 | Gill | 352—204 |
| 1,440,004 | 12/1922 | Campbell et al. | 352—114 |
| 1,469,474 | 10/1923 | Bauersfeld | 352—114 |
| 1,486,362 | 3/1924 | Campbell et al. | 352—114 |
| 1,540,902 | 6/1925 | Rogers | 352—114 |
| 1,573,804 | 2/1926 | Campbell et al. | 352—114 |
| 1,989,553 | 1/1935 | Kanolt | 88—1 |
| 2,029,300 | 2/1936 | Arfsten | 352—40 |
| 2,203,651 | 6/1940 | Capstaff | 352—45 |
| 2,238,629 | 4/1941 | Deninson | 352—44 |
| 2,287,145 | 6/1942 | Stephen et al. | 96—81 |
| 2,661,651 | 12/1953 | Stipek | 352—58 |
| 2,821,110 | 1/1958 | Cook | 88—57 |
| 2,905,969 | 9/1959 | Gilbert et al. | 18—19 |
| 2,928,124 | 3/1960 | Hugger | 18—19 |
| 3,046,330 | 7/1962 | Ross | 88—1 |

FOREIGN PATENTS

| | | |
|---|---|---|
| 767,716 | 5/1934 | France. |
| 843,957 | 4/1939 | France. |
| 936,326 | 2/1948 | France. |
| 954,871 | 6/1949 | France. |
| 969,495 | 5/1950 | France. |
| 1,068,166 | 2/1954 | France. |
| 844,533 | 7/1952 | Germany. |
| 537 | of 1860 | Great Britain. |
| 7,306 | of 1908 | Great Britain. |
| 393,257 | 8/1931 | Great Britain. |
| 476,850 | 12/1937 | Great Britain. |
| 254,420 | 7/1927 | Italy. |

OTHER REFERENCES

Photography, Neblette, 3rd edition, 1938, Van Nostrand Co., Inc. pages 249–250 cited.

JULIA E. COINER, *Primary Examiner*.

EMIL. G. ANDERSON, WILLIAM MISIEK, NORTON ANSHER, *Examiners*.

J. R. DUNCAN, *Assistant Examiner*.